(12) United States Patent
Lyon

(10) Patent No.: US 7,583,562 B2
(45) Date of Patent: Sep. 1, 2009

(54) TRANSDUCER CIRCUIT COUPLED TO A CONTROL UNIT THROUGH A CABLE

(75) Inventor: George Quinton Lyon, Peterborough (CA)

(73) Assignee: Siemens Milltronics Process Instruments, Inc., Peterborough (CA)

(*) Notice: Subject to any disclaimer, the term of this patent is extended or adjusted under 35 U.S.C. 154(b) by 414 days.

(21) Appl. No.: 11/598,882

(22) Filed: Nov. 14, 2006

(65) Prior Publication Data

US 2007/0194659 A1 Aug. 23, 2007

(30) Foreign Application Priority Data

Nov. 14, 2005 (EP) ................... 05024839

(51) Int. Cl.
H04B 1/06 (2006.01)

(52) U.S. Cl. .................. 367/135; 367/903

(58) Field of Classification Search .......... 367/903, 367/135
See application file for complete search history.

(56) References Cited

U.S. PATENT DOCUMENTS

| 5,024,104 | A | * | 6/1991 | Dames | 73/861.357 |
| 5,602,346 | A | * | 2/1997 | Kitami et al. | 73/861.357 |
| 2005/0125117 | A1 | | 6/2005 | Breed | |
| 2007/0194659 | A1 | * | 8/2007 | Lyon | 310/314 |

FOREIGN PATENT DOCUMENTS

| EP | 0041075 | * 12/1981 |
| EP | 0 375 300 A1 | 6/1990 |
| EP | 1785700 A1 | * 5/2007 |

* cited by examiner

*Primary Examiner*—Dan Pihulic

(57) ABSTRACT

The transducer circuit includes a transducer component, a drive circuit for the transducer component, a control port for coupling the drive circuit to a control unit and a modulator. The modulator has an input port for receiving a signal or data from another device. The modulator has an output which is coupled to an output stage in the drive circuit. The modulator operates to transmit data, received at the input port, through the drive circuit and the control port to a control unit.

27 Claims, 3 Drawing Sheets

1

TRANSDUCER CIRCUIT COUPLED TO A CONTROL UNIT THROUGH A CABLE

CROSS REFERENCE TO RELATED APPLICATIONS

This application claims priority of European application No. 05024839.2 EP filed Nov. 14, 2005, which is incorporated by reference herein in its entirety.

FIELD OF THE INVENTION

The present invention relates to a transducer circuit coupled to a control unit through a cable.

BACKGROUND OF THE INVENTION

Time of flight ranging systems find use in level measurements applications, and are commonly referred to as level measurement systems. Level measurement systems determine the distance to a reflective surface (i.e., a reflector) by measuring how long after transmission of energy an echo is received. Such systems may utilize ultrasonic pulses, pulse radar signals, or other microwave energy signals.

Radar and microwave-based level measurement systems are typically used in applications where the atmosphere in the container or vessel is subject to large temperature changes, high humidity, dust and other types of conditions that can affect signal propagation. The nature of such electromagnetic wave systems makes them less susceptible to signal degradation due to the effects of humidity, dust and the like in the operating environment. Ultrasonic based level measurement systems also find widespread application in industry. In such industrial measurement and control applications, a sensor (e.g., an electromagnetic transducer) is often distant from its associated control electronics (e.g., a controller). If the transducer is an integral part of the industrial process, the distance between the transducer and the controller may be short. Alternatively, ultrasonic transducers are sometimes located several hundred meters away from the controller. The transducer typically communicates a measured variable to the controller for further processing or distribution. Because of the adverse conditions for operating the transducers, it is sometimes beneficial for the controller to know more than just the primary variable supplied by the transducer.

Accordingly, there remains a need for improvements in the art.

SUMMARY OF THE INVENTION

The present invention provides a transducer circuit coupled to a control unit through a cable as defined in the claims, i.e. a transducer circuit coupled to a control unit through a cable, said transducer circuit comprising:
 a transducer component;
 a control port;
 a data port;
 a drive circuit coupled to said transducer component and having an input-output stage coupled to said control port, and said control port being adapted for connecting to the cable; and
 a modulator having an input port and an output port, said input port being coupled to said data port for receiving a data signal;
 said drive circuit including an output stage coupled to the output port of said modulator for outputting a modulated signal to the control unit corresponding to said received data signal.

Preferred embodiments of the system and the method according to the invention are specified in the dependent claims.

The invention thus makes it possible to transmit data received at the data port of the transducer circuit through the control port and via the cable to the control unit.

BRIEF DESCRIPTION OF THE DRAWINGS

Reference is now made to the accompanying drawings which show, by way of example, embodiments of the present invention and in which.

DETAILED DESCRIPTION OF THE INVENTION

Figure 1:
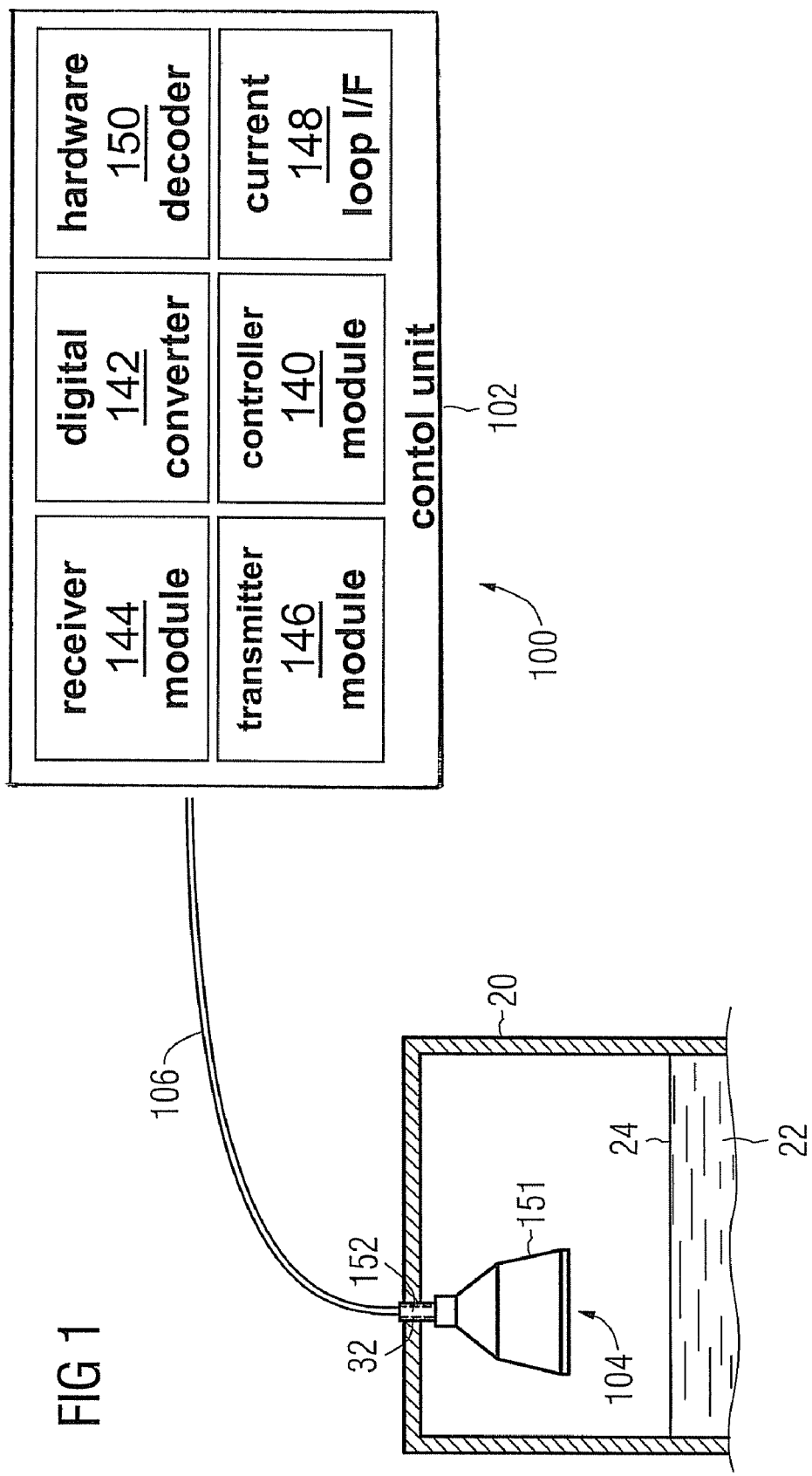
FIG. 1 shows in diagrammatic form a level measurement system with a remote transducer according to one embodiment of the present invention.

Reference is first made to FIG. 1, which shows in diagrammatic form a level measurement apparatus with a remote transducer according to an embodiment of the present invention. The level measurement apparatus is indicated generally by reference 100 and comprises a control unit 102 and a transducer module 104. As depicted in FIG. 1, the transducer module 104 is located remotely from the control unit 102 and connected by a cable 106.

Referring to FIG. 1, the transducer module 104 is coupled to a container or vessel 20, which holds a material 22 (e.g., a liquid, slurry or solid). The level measurement apparatus 10 functions to determine the level of the material 22 held in the vessel 20. The level of the material 20 is defined by a top surface, denoted by reference 24, which provides a reflective surface for reflecting ultrasonic waves or energy pulses. The vessel or container 20 has an opening 32 for mounting and/or securing the transducer module 104.

The control unit 102 may be implemented as a stand-alone unit or integrated with a computer (e.g. a PC or industrial computer). The control unit 102 comprises a controller module 140, an analog-to-digital converter 142, a receiver module 144 and a transmitter module 146. The receiver module 144 comprises electronic circuitry which interfaces the controller 140 to the transducer module 104, and may include an amplifier, envelope detector or filter, which are used to condition the electrical signal output of the transducer module 104 corresponding to a receive or echo pulse. The transmitter module 146 also comprises electronic circuitry which interfaces the controller 140 to the transducer module 104 for controlling the emission of transmit pulses from the transducer module 104.

The controller module 140 comprises a microprocessor or a microcontroller with "on-chip" resources, such as program memory (e.g. EEPROM or NVRAM), data memory (e.g. RAM), a serial communication (e.g. modem) interface, and the A/D converter. The A/D converter 142 may be implemented using the "on-chip" A/D converter. The microprocessor operates under the control of a program, for example, stored in the form of firmware in the program memory. The program comprises a plurality of code components or modules (i.e. software or code means) which implement or provide the functions or functionality associated with the operation of the level measurement device 100. Under the control of the code components, the microprocessor operates the electronic circuitry (i.e. the hardware interfaces) associated with the receiver 144, transmitter 146 and A/D converter 142 modules.

The control unit 102 may also include a current loop interface 148. The current loop interface 148 interfaces the device 100 to a power/communication loop, for example, a 4-20 mA current loop. A remote receiver, for example, a plant control computer, is coupled at the other end of the current loop. For a typical 4-20 mA current loop configuration, the loop provides a current in the range of 4 to 20 mA and a loop voltage in the range 18 to 30 Volts. The loop voltage is nominally at 24 Volts. The resistance of the loop is typically in the range 0 to 550 Ohms. While the loop current is normally in the range 4 to 20 mA, the current may range from 3.6 to 21.6 mA.

To perform a level measurement, the controller 140 executes a code component to generate a transmit pulse control signal for the transmitter module 146 which is applied to the transducer module 104, and the transducer 104 emits an ultrasonic pulse or burst directed at the surface 24 of a material 22 contained in the storage container or vessel 20. The reflected or echo pulses, i.e. the propagated transmit pulses reflected by the surface 24 of the material 22, are coupled by the transducer module 104 and converted into electrical signal(s). The electrical signal(s) are processed (e.g. conditioned) by the receiver module 144 and then converted by the A/D converter 142 into a digital signal. The digitized signal is inputted by the controller 140 and a code component is executed by the controller 140 to generate a receive echo waveform or profile for the received echo pulses. The controller 140 executes an algorithm (i.e. a code component) which identifies and verifies the echo pulse and calculates the range, i.e. the distance to the surface 24 (i.e. reflector), from the time it takes for the reflected energy pulse to travel from the reflective surface 24 to the transducer 104. From this calculation, the distance to the surface 24 of the material 22, and thereby the level of the material 22 in the vessel 20, is calculated or determined.

In a computer (e.g. PC) implementation, the control unit 102 comprises an interface card for coupling to the cable 106 and a computer program comprising one or more functions or routine for implementing the receiver module 144, the transmitter module 146, the A/D converter module 142 and the controller functions, for example, as described above. The interface card may include additional electronic components or circuits for the modules.

Referring again to FIG. 1, the transducer module 104 comprises an enclosure or housing 151. Inside the housing 151 is mounted a transducer component and a transducer circuit as will be described in more detail below. The housing 151 includes a collar 152 which may be threaded to screw into the opening 32 in the vessel 20 which has a mating thread. The cable 106 from the control unit 102 is coupled to the collar 152 and electrically connected to the transducer circuit inside the enclosure 151. It will be appreciated that other attachment or clamping devices, for example, a flanged connector mechanism, may be used to secure the transducer module 104 to the opening 32 and/or the vessel 20 as will be familiar to those skilled in the art.

Figure 2:
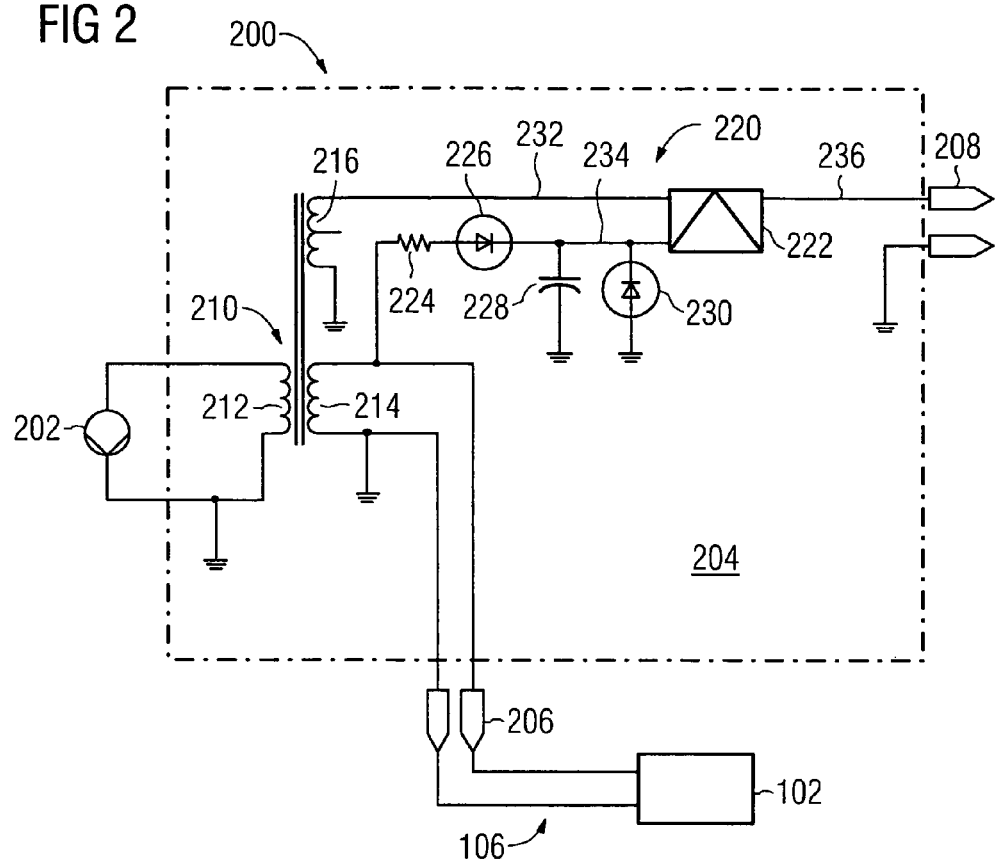
FIG. 2 shows an implementation of a transducer circuit according to an embodiment of the present invention.

Reference is next made to FIG. 2, which shows the transducer module according to an embodiment of the present invention and indicated generally by reference 200. The transducer module 200 comprises an enclosure or housing 151 (FIG. 1), a transducer component 202 and a transducer circuit 204. The transducer module 200 includes a first port 206 and a second port 208. The first port 206 connects to the cable 106 and couples the transducer module 200 to the control unit 102. The second port 208 provides a second communication channel as will be described in more detail below. A transformer 210 has a secondary winding 212, a primary winding 214, and a second primary or auxiliary winding 216. The primary winding 214 is coupled to the port 206 and is coupled to the control unit 102 (FIG. 1) through the cable 106.

As shown in FIG. 2, the auxiliary winding 216 is coupled to a communication circuit 220. The communication circuit 220 includes a modulator 222. The modulator 222 has an output port comprising a first terminal 232 and a second terminal 234. The first terminal 232 is connected to the auxiliary winding 216 of the transformer 210. The second terminal 234 is coupled to the primary winding 214 through a series connected resistor 224 and diode 226. A capacitor 228 and a diode 230 are coupled between the second terminal 234 and ground as shown. The diodes 226, 230 and the capacitor 228 form an energy storage circuit for the modulator 222. The modulator 222 has an input port 236 which is connected to the second port 208. The second port 208 comprises a second communication channel and as will be described in more detail below, the communication circuit 220 functions to transmit data received at the second port 208 to the control unit 102 via the first communication port 206 and the cable 106.

The communication circuit 220 is configured to store energy using the capacitor 228 and the diodes 226 and 230 during a period when the transducer component 202 is driven by the control unit 102 through the primary winding 214, for example, to transmit an ultrasonic pulse or burst. It will be appreciated that the energy storage is parasitic which uses little power and does not disturb the level measurement system. The energy storage components are selected to store enough energy from the winding 214 to drive an additional data communication or transmission at a later time by the modulator 222. The data or signal for the additional communication is received by the modulator 222 through the port 208 which is connected to the input port 236. The second port 208 may be coupled to another remote control unit, a temperature sensor or other type of data generating device or data storage device. The data may take many forms, including a separate measured variable such as temperature or built-in variables such as compensation values stored in a non-volatile memory of a further controller that may be coupled to the second port 208.

The modulator 222 transmits the data or information to the control unit 102 by applying the data signal at the port 206 through the terminal 232 coupled to the second primary winding 216 and the terminal 234 coupled to the first primary winding 214. The signal applied to the port 206 and transmitted over the cable 106 is received at the receiver module 144 (FIG. 1) and decoded by the controller 140, which executes a code component. The signal transmitted over the cable 106 may have the same voltage and frequency ranges as the echo signal provided by the transducer 202 for a typical pulse echo operation. A transmission sequence from the modulator 222 may be initiated when the voltage on the storage capacitor 228 reaches a certain (i.e. trigger) level. The transmission sequence may also be initiated by transmission of a control or trigger pulse or signal by the control unit 102 to the port 206 via the cable 106.

According to one embodiment, a data transmission is initiated, when it is known that no echo signals are expected. For example, the control unit 102 (FIG. 1) includes a code component which performs a timing function after a transmit pulse. After the transmit pulse, which is detected by the modulator 222 (FIG. 2), the code component counts down a predetermined time interval or period to allow any echoes to die down or decay, for example, 500 msec, then data is transmitted from the modulator 222. In other words, an echo pulse sequence comprises a 500 msec window or time period, followed by a data transmission window (for example, 200 msec), followed by another echo pulse sequence of 500 msec, followed by another data transmission window, and so on. As described above, the modulator 222 may be configured to transmit data after there is adequate power in the storage capacitor 228 (FIG. 2). The code component in the control unit 102 will also function to decode the modulated data transmitted by the modulator 222, e.g. during the data transmission period or window. According to another embodiment, the data transmission may include verification or transmission control data, such as a parity bit, start and stop bits, or a checksum or CRC (for example, for a large data block transmission). According to another embodiment, the data transmission may comprise a sequence of data packets, the length or size of each data packet being dependent on the available power and the data transmission window or period.

The modulator 222 may be implemented to provide one or more of a number of modulation techniques for transmitting information to the control unit 102. Furthermore, the communication between the modulator 222 and the control unit 102 may comprise analog or digital modulation. For a digital implementation, a serial communication protocol may be utilized. Exemplary encoding techniques that may be applied by the modulator 222 include Pulse Width Modulation (PWM), Pulse Amplitude Modulation (PAM), and Pulse Position Modulation (PPM), as will be described in more detail below. The modulation techniques or mechanisms as described herein are implemented in the modulator 222 in the form of hardware and/or a combination of hardware and software, for example, using a low power microcontroller with on-chip program memory and data memory which is suitably programmed to execute the operations associated with the modulation techniques. The specific implementation details either approach will be within the understanding of those skilled in the art.

Figure 3:
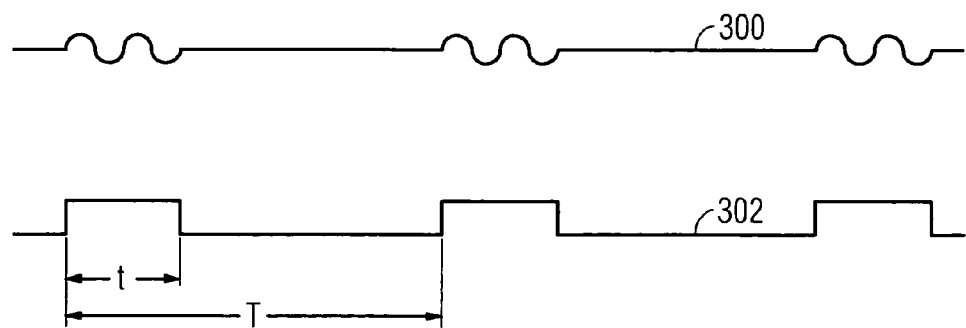
FIG. 3 shows a communication signal for the transducer circuit according to an embodiment of the present invention.

Reference is made to FIG. 3, which shows a representative PWM signal 300 in accordance with an embodiment of the present invention. By transmitting a burst of a high frequency signal (e.g., of the same frequency emitted by the transducer component 202 in FIG. 2), a binary value is communicated. The binary value is represented by the length of the transmitted burst relative to its repetition time, as is done with conventional PWM signals, as shown by a signal 302. In one example, if there are 32 possible states that must be communicated, then a variable (e.g., ValueMax) is set to 32 and the width (i.e., the duration) of the high frequency burst may be set in increments of, for example, 1 millisecond. Therefore, a 1 ms burst represents a value of 1, and a 2 ms burst represents a value of 2, etc. The signal 300 represents a signal generated by the modulator 222 (FIG. 2) and the signal 302 represents an equivalent PWM signal detected by the control unit 102 (FIG. 1 or FIG. 2). The equation of the binary value represented by the signals 300 and 302 is given by:

Binary Value=$(T/t)$*(Value Max), where:
t is the duration of the pulse or burst,
T is the period.

It is also possible to communicate sequentially if a much larger set of values is to be communicated. In another example, the maximum value may be set to 11 and a repetition rate of 11 ms (e.g., the period) will allow a 1 ms burst to represent 0, a 2 ms burst to represent 1, a 3 ms to represent 2, up to a 10 ms burst representing the value 9. Some additional values like 0 ms and 11 ms may be useful for representing the start of a sequence of bursts or error conditions. If all the values between 0 and 9 are represented along with some form of error correction, it becomes possible to communicate decimal numbers of any length.

The information contained in the signal 300 is decoded at the control unit 102 (FIG. 2) by the controller 140 (FIG. 1), i.e. microprocessor, executing a code component. The microprocessor operating under the code component may monitor an input from the transducer module 200 (e.g., at the port 206) for a certain time span after a transmission pulse is applied to the first primary winding 214 by the control unit 102, for example, during a level measurement operation. The control unit 102 then looks for binary values transmitted by the modulator 222. In another example, the control unit 102 may also recognize the codes being transmitted by the modulator 222 through the use of a hardware decoder indicated by reference 150 in FIG. 1. The average value of the signal 302 is directly proportional to the binary value being sent. The hardware decoder 150 may comprise a simple low pass filter, which renders an analog value proportional to the code transmitted. The output of the low pass filter may then be read by an analog to digital converter to receive the transmitted code from the modulator 222 a short while after the controller 102 transmits a pulse using the transducer component 202 and any or all possible reflections have decayed. Alternatively, the control unit 102 may monitor for codes transmitted within a certain time window after receiving a reflected pulse from the transducer 202. As such, the control unit 102 and the modulator 222 apply time division multiplexing.

Figure 4:
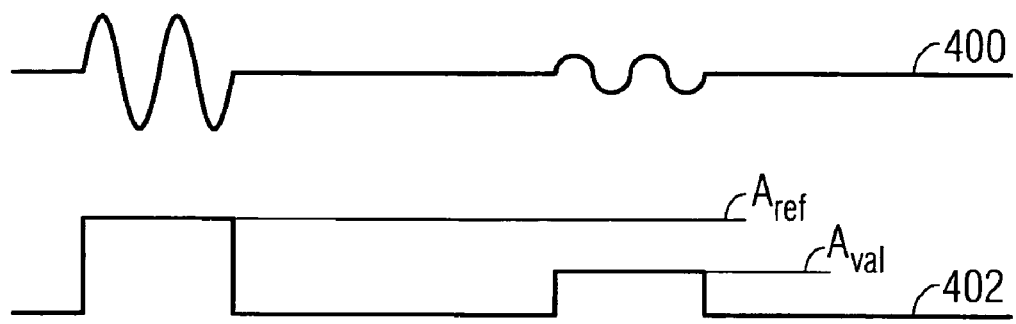
FIG. 4 shows a communication signal in accordance with another embodiment of the present invention.

Reference is next made to FIG. 4, which shows a representative PAM signal 400 in accordance with an embodiment of the present invention. The PAM implementation can be designed to operate in a similar manner to the PWM system described above with reference to FIG. 3. In one example, a value being transmitted by the modulator 222 (FIG. 2) is encoded in the amplitude of a generated high frequency burst of the signal 400. As shown in FIG. 4, the PAM system makes use of a reference signal to calibrate itself. A reference pulse $A_{ref}$ allows the system to calibrate itself. By transmitting the reference signal $A_{ref}$ having a maximum amplitude relative to a maximum of the range of values that may be communicated, the data value later transmitted is proportionally smaller or equal. This means that no factory calibration or drift compensation is necessary. If the system has a linear detector, a particular value communicated by the signal 400 is simply calculated as the ratio of the amplitude of a particular high frequency burst of the signal (e.g., the value $A_{val}$ shown in the PAM signal 402) to that of the reference $A_{ref}$. If the control unit 102 is equipped with a logarithmic detector (for example, in the receiver module 144 shown in FIG. 1), a log scale factor is needed in the absence of a second reference pulse to calculate the transmitted value. Again, data may be transmitted sequentially to extend the range of the numbers or the information that may be communicated. It is possible to decode the value transmitted in the signal 400 using either hardware or software (e.g. a code component executed by the microprocessor 140).

Figure 5:
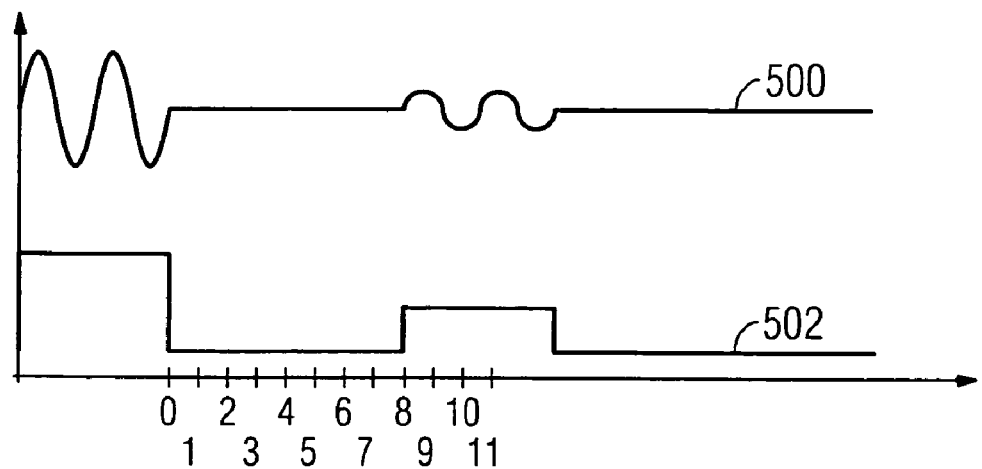
FIG. 5 shows a communication signal in accordance with another embodiment of the present invention.

Reference is next made to FIG. 5, which shows a representative PPM signal 500 according to another embodiment of the present invention. In the signal 500, the position of the high frequency burst (e.g., the position of the pulse in the corresponding signal 502) communicates a desired code. As shown in FIG. 5, a larger reference burst of the signal 500 marks the start of the data communication and the position of subsequent data bursts communicates data values. Alternatively, the use a reference burst to mark the start of the data communication may not be used and the transmission may be repeated with a fixed delay or no time delay between the bursts. Further, if the reference burst has the same amplitude as the data burst, the data burst may be recognized by other means and only one sequence may be sent. Many different algorithms may be designed to communicate the data values desired. In the example shown in FIG. 5, the control unit 102 (FIG. 2) may begin monitoring the signal 500 after receipt of the reference burst. The subsequent high frequency burst occurs after a delay of 8 ms, thus indicating a value of 8.

In another aspect of the present invention, data to be communicated to the controller 102 is directly digitally encoded using encoding schemes, for example, as found in self clocking serial protocols. In this case, the modulation method employed may be similar to the examples described above, but with the primary measured signal being perturbed. As such, the encoding may be unrelated to the amplitude, position, or width of the signal. Binary phase shift keying may also be used, where the data to be transmitted controls the phase of a square wave carrier. One example of this type of encoding is Manchester or Non Return to Zero (NRZ) encoding. In NRZ encoding, data bits are represented by transitions from one logical state to the other, with these transitions appearing sequentially to make up a data word. There are many such serial communication schemes, any of which may be applied to the present invention, where suitable.

While an example of an ultrasonic transducer component 202 (FIG. 2) in a level measurement application has been described, the principles described above are applicable to any other suitable sensor or transducer. In one example, a strain sensor could also be modified so that an output of the strain sensor is modulated by the use of a resistive switch appropriately placed in a sensing path of the strain sensor. In another example, a capacitive sensor may have a reference capacitor switched in and out of the capacitive sensor circuit to modulate the sensed signal being communicated back to the control unit 102 (FIG. 2). Additionally, power for the modulator 222 may not be parasitically obtained. In one embodiment, a battery may be used to power the modulator 222 if power consumption of the modulator 222 can be kept low. In another embodiment, power may be supplied directly to the modulator 222 by the control unit 102 in a manner that does not affect the transducer component 202. While only one input port 208 is shown coupled to the modulator 222, the modulator 222 may have any number of input ports, enabling the modulator 222 to send any number of signals back to the control unit 102.

The concept of using a similar signal to the one being sensed by the transducer device or component 202 (FIG. 2) to transmit data back to the control unit 102 is not intended to be a limiting factor of the present invention. In one aspect, it may be possible to configure the hardware around the transducer component 202 and the control unit 102 to communicate the desired information using different means. In one embodiment, the additional information may be superimposed by the modulator 222 on the primary signal supplied by the transducer component 202 at a different frequency that the control unit 102 can separate from the primary signal (e.g., frequency division multiplexing). For example, a strain gauge system uses a sensed signal that is slowly varying and an additional signal may be modulated at a higher frequency than the strain gauge signal. The additional signal may be an alternating current signal with an average value of zero, thus not disturbing the low frequency strain gauge signal.

The invention claimed is:

1. A transducer circuit coupled to a control unit via a cable, comprising:
    a transducer component;
    a control port for connecting to the cable;
    a data port;
    a modulator having an input port and an output port, said input port being coupled to said data port for receiving a data signal; and
    a drive circuit coupled to said transducer component, the drive circuit comprising:
        an input-output stage coupled to said control port, and
        an output stage coupled to the output port of said modulator for outputting a modulated signal to the control unit corresponding to said received data signal,
    wherein said modulator comprises a pulse amplitude modulator and converts said data signal into a pulse amplitude modulated signal for the control unit.

2. The transducer circuit according to claim 1, further comprising a power supply circuit for said modulator, said power supply circuit comprising an energy storage device coupled to said drive circuit for tapping energy.

3. The transducer circuit according to claim 1, wherein said energy storage device comprises a capacitor and a blocking diode.

4. The transducer circuit according to claim 1, wherein said drive circuit comprises a transformer comprising:
    an electromagnetically coupled primary winding comprising said input-output stage and being connected to said control port,
    an electromagnetically coupled secondary winding connected to said transducer component, and
    an electromagnetically coupled auxiliary winding comprising said output stage for said drive circuit.

5. The transducer circuit according to claim 1, wherein said modulator comprises a pulse width modulator and converts said data signal into a pulse width modulated data signal for the control unit.

6. The transducer circuit according to claim 5, wherein said modulated data signal is transmitted as an alternating current signal burst.

7. The transducer circuit according to claim 6, wherein said modulated data signal is transmitted as a plurality of alternating current signal bursts.

8. The transducer circuit according to claim 1, wherein said modulator comprises a pulse position modulator and converts said data signal into a pulse position modulated signal for the control unit.

9. A transducer circuit coupled to a control unit via a cable, comprising:
    a transducer component;
    a control port for connecting to the cable;
    a data port;
    a modulator having an input port and an output port, said input port being coupled to said data port for receiving a data signal; and
    a drive circuit coupled to said transducer component, the drive circuit comprising:
        an input-output stage coupled to said control port, and
        an output stage coupled to the output port of said modulator for outputting a modulated signal to the control unit corresponding to said received data signal,
    wherein said modulator applies binary phase shift keying to the received data signal.

10. The transducer circuit according to claim 9, wherein the control unit includes a decoder for decoding said modulated data signal.

11. The transducer circuit according to claim 9, further comprising a power supply circuit for said modulator, said power supply circuit comprising an energy storage device coupled to said drive circuit for tapping energy.

12. The transducer circuit according to claim 9, wherein said energy storage device comprises a capacitor and a blocking diode.

13. The transducer circuit according to claim 9, wherein said drive circuit comprises a transformer comprising:
   an electromagnetically coupled primary winding comprising said input-output stage and being connected to said control port,
   an electromagnetically coupled secondary winding connected to said transducer component, and
   an electromagnetically coupled auxiliary winding comprising said output stage for said drive circuit.

14. The transducer circuit according to claim 9, wherein said modulator comprises a pulse width modulator and converts said data signal into a pulse width modulated data signal for the control unit.

15. The transducer circuit according to claim 14, wherein said modulated data signal is transmitted as an alternating current signal burst.

16. The transducer circuit according to claim 15, wherein said modulated data signal is transmitted as a plurality of alternating current signal bursts.

17. The transducer circuit according to claim 9, wherein said modulator comprises a pulse position modulator and converts said data signal into a pulse position modulated signal for the control unit.

18. The transducer circuit according to claim 9, wherein the control unit includes a decoder for decoding said modulated data signal.

19. A transducer circuit coupled to a control unit via a cable, comprising:
   a transducer component;
   a control port for connecting to the cable;
   a data port;
   a modulator having an input port and an output port, said input port being coupled to said data port for receiving a data signal; and
   a drive circuit coupled to said transducer component, the drive circuit comprising:
      an input-output stage coupled to said control port, and
      an output stage coupled to the output port of said modulator for outputting a modulated signal to the control unit corresponding to said received data signal,
   wherein said modulator includes frequency division multiplexing to avoid interference between said modulated data signal and a transducer signal.

20. The transducer circuit according to claim 19, further comprising a power supply circuit for said modulator, said power supply circuit comprising an energy storage device coupled to said drive circuit for tapping energy.

21. The transducer circuit according to claim 19, wherein said energy storage device comprises a capacitor and a blocking diode.

22. The transducer circuit according to claim 19, wherein said drive circuit comprises a transformer comprising:
   an electromagnetically coupled primary winding comprising said input-output stage and being connected to said control port,
   an electromagnetically coupled secondary winding connected to said transducer component, and
   an electromagnetically coupled auxiliary winding comprising said output stage for said drive circuit.

23. The transducer circuit according to claim 19, wherein said modulator comprises a pulse width modulator and converts said data signal into a pulse width modulated data signal for the control unit.

24. The transducer circuit according to claim 23, wherein said modulated data signal is transmitted as an alternating current signal burst.

25. The transducer circuit according to claim 24, wherein said modulated data signal is transmitted as a plurality of alternating current signal bursts.

26. The transducer circuit according to claim 19, wherein said modulator comprises a pulse position modulator and converts said data signal into a pulse position modulated signal for the control unit.

27. The transducer circuit according to claim 19, wherein the control unit includes a decoder for decoding said modulated data signal.

* * * * *